US007603586B1

(12) United States Patent
Skladanowski et al.

(10) Patent No.: US 7,603,586 B1
(45) Date of Patent: Oct. 13, 2009

(54) INTELLIGENT STATIONARY POWER EQUIPMENT AND DIAGNOSTICS

(75) Inventors: David Skladanowski, Warren, MI (US); Matt Logsdon, Cary, IL (US); Sunil Reddy, Corpus Christi, TX (US); Dennis Essenmacher, Royal Oak, MI (US)

(73) Assignee: Snap-On Incorporated, Pleasant Prairie, WI (US)

( * ) Notice: Subject to any disclaimer, the term of this patent is extended or adjusted under 35 U.S.C. 154(b) by 257 days.

(21) Appl. No.: 11/320,830

(22) Filed: Dec. 30, 2005

(51) Int. Cl.
*G06F 11/00* (2006.01)
*G06F 19/00* (2006.01)
*G01B 5/28* (2006.01)
*G01B 5/30* (2006.01)
*G01R 31/00* (2006.01)
*G06F 15/00* (2006.01)
*G06F 11/30* (2006.01)
*G21C 17/00* (2006.01)

(52) U.S. Cl. ............... 714/31; 714/46; 700/177; 702/35; 702/58; 702/183; 702/188; 701/29; 340/539.24

(58) Field of Classification Search ............... 700/26, 700/108, 177, 286, 287, 291; 702/183, 188, 702/184, 185, 35, 58; 340/310.11, 539.24, 340/853.2, 870.07, 870.16; 714/25, 30, 31, 714/46; 701/29
See application file for complete search history.

(56) References Cited

U.S. PATENT DOCUMENTS

| | | | | | |
|---|---|---|---|---|---|
| 5,566,092 | A | * | 10/1996 | Wang et al. ............ | 702/185 |
| 6,175,788 | B1 | * | 1/2001 | Hasegawa et al. ....... | 701/29 |
| 6,295,510 | B1 | * | 9/2001 | Discenzo ............... | 702/183 |
| 6,493,616 | B1 | * | 12/2002 | Rossow et al. .......... | 701/29 |
| 6,615,090 | B1 | * | 9/2003 | Blevins et al. .......... | 700/26 |
| 6,618,648 | B1 | * | 9/2003 | Shirota et al. .......... | 700/291 |
| 6,629,397 | B1 | * | 10/2003 | Focke et al. ........... | 53/55 |
| 6,633,782 | B1 | * | 10/2003 | Schleiss et al. ......... | 700/26 |
| 6,745,154 | B2 | * | 6/2004 | Mifune et al. .......... | 702/188 |
| 6,823,291 | B2 | * | 11/2004 | Marsland .............. | 702/188 |
| 6,892,317 | B1 | * | 5/2005 | Sampath et al. ........ | 714/4 |
| 6,973,376 | B2 | * | 12/2005 | Kusaka et al. .......... | 700/286 |
| 7,142,990 | B2 | * | 11/2006 | Bouse et al. ........... | 702/35 |
| 7,209,804 | B2 | * | 4/2007 | Curt et al. ............. | 700/286 |

(Continued)

FOREIGN PATENT DOCUMENTS

JP 2005202886 A * 7/2005

OTHER PUBLICATIONS

International Search Report and the Written Opinion of the International Searching Authority issued in Patent Application No. PCT/US07/00147 dated on Aug. 29, 2008.

*Primary Examiner*—Crystal J Barnes-Bullock
(74) *Attorney, Agent, or Firm*—McDermott Will & Emery LLP

(57) ABSTRACT

Stationary power equipment including a sensing device configured to collect data associated with an operation of the equipment, and a data storage device configured for storing the collected data. Information derived from the collected data may be transmitted to a remote system via a data transmission network, or be downloaded to a data storage medium or a diagnostic device. An operation condition of the stationary power equipment is determined based on the information. Responsive to the operation condition, the power equipment receives data that is selected based on the operation condition, and modifies an operation of the power equipment based on the received data.

13 Claims, 4 Drawing Sheets

U.S. PATENT DOCUMENTS

| | | | |
|---|---|---|---|
| 7,308,385 B2 * | 12/2007 | Wegerich et al. | 702/183 |
| 2002/0194320 A1 * | 12/2002 | Collins et al. | 709/223 |
| 2003/0218549 A1 * | 11/2003 | Logvinov et al. | 340/870.07 |
| 2004/0158474 A1 * | 8/2004 | Karschnia et al. | 705/1 |
| 2005/0066231 A1 * | 3/2005 | Szucs et al. | 714/25 |
| 2005/0080322 A1 * | 4/2005 | Korman | 600/300 |
| 2006/0095231 A1 * | 5/2006 | Okazaki et al. | 702/183 |
| 2006/0259201 A1 * | 11/2006 | Brown | 700/291 |
| 2006/0259332 A1 * | 11/2006 | Brown | 705/3 |
| 2007/0078614 A1 * | 4/2007 | Discenzo et al. | 702/60 |

* cited by examiner

INTELLIGENT STATIONARY POWER EQUIPMENT AND DIAGNOSTICS

FIELD OF DISCLOSURE

The present disclosure relates to intelligent stationary power equipment and diagnostics thereof, and more specifically, to stationary power equipment that collects and stores data associated with the operations of the equipment.

BACKGROUND OF THE DISCLOSURE

The term "power equipment" is used throughout this disclosure in a generic sense to encompass any equipment that converts a first type of energy or power to a second type of energy or power. For instance, one type of power equipment generates mechanical power by using at least one of electrical energy, kinetic energy, fuel energy, hydropower, nuclear energy, solar energy, pneumatic energy and mechanical power, etc. Examples of this type of power equipment include electric motors, diesel motors, hybrid engines, pumps, windmills, and so on. Another type of power equipment generates electrical power by using at least one of petroleum energy, chemical reactions, mechanical power, kinetic energy, hydropower, pneumatic energy, nuclear energy and so on. Examples of this type of power equipment include power generators, alternators, etc. The term "stationary power equipment" refers to all types of power equipment excluding power equipment that is installed onboard of vehicles and used to provide power to move, drive or propel the vehicles, such as automobiles, trains, airplanes, yachts, rockets, trucks, etc.

Some types of stationary power equipment, such as pumps or electrical power generators, are installed in remote locations or distributed over a large area, without technicians or operators on site. Although regular visits and scheduled checks may help uncover malfunctions or errors in the equipment, the visits and checks are costly and time-consuming. Once an error is suspected, a technician usually needs to spend a long time performing various tests on the equipment to determine the symptoms and operation status of the equipment, in order to identify the type of, and causes to the error, and needed steps to fix the error.

Some fixes may need replacement parts. In some cases, the technician may also need to consult specifications or technical manuals to perform needed procedures to repair the equipment. However, the replacement parts and the technical manuals usually are unavailable at the site. Consequently, a second visit to the defunct equipment is necessary to bring the needed parts and/or technical manuals in order to perform the needed diagnostics and fixes.

Furthermore, certain errors or malfunctions may cause serious damages if they are not uncovered, or if certain remedies are not performed soon. However, malfunctions or errors may occur between scheduled visits or checks without being known, which may cause seriously consequences.

Therefore, there is a need for an easy way to obtain data related to the operation of stationary power equipment, to assist technicians performing maintenance works without the need of performing excessive tests. There is also a need to notify technicians about errors or malfunctions of stationary power equipment as soon as they occur. There is also a need for stationary power equipment with self-diagnostic capacities, such that information related to possible causes to malfunctions could be isolated by the equipment.

SUMMARY OF THE DISCLOSURE

Various embodiments are disclosed relating to stationary power equipment that collects operation data related to the operation of the equipment, and provides information derived from the operation data. Examples of the collected data include temperature, voltage, ampere, wave phase, torque, engine rpm, pressure, switch status, resistance, impedance, signal frequency, etc. The collected data is stored in a data storage device, such as nonvolatile memories, hard disks, etc. The information derived from the collected data may be sent to a device connected to the stationary power equipment or a remote system via a data transmission network, such as the internet or a telephone network, in a wired or wireless manner. For instance, the operation data is sent to a diagnostic system at a remote site via a data transmission network for performing a remote diagnosis on the stationary power equipment. The power equipment receives data sent from a remote system via the data transmission network. The data is selected based on information derived from the transmitted signals. The power equipment modifies an operation based on the data received from the remote system. The stationary power equipment is powered by fossil fuel. The fossil fuel may be in different form, such as gasoline, natural gas, diesel, coal, etc.

In one embodiment, the information derived from the operation system is caused to be sent to a remote diagnostic system in response to a specific command received from the data transmission network, or in response to the occurrence of an error. In another embodiment, the information derived from the operation data is caused to be sent to a remote site regularly or on a periodic basis, such as after the elapse of a predetermined period of time or whenever the usage of the data storage device exceeds a predetermined threshold.

According to another embodiment, the data processing device in the stationary power equipment performs a self diagnosis based on the collected operation data. In response to the diagnosis indicating that an error exists, the stationary power equipment may take certain actions. For instance, the data processing device may execute machine-executable instructions to perform a fix procedure corresponding to the detected error. The machine-executable instructions may be pre-stored in the stationary power equipment, or obtained dynamically from a remote site by sending a request identifying the type of the error.

In one embodiment, after an error is identified, the data processing system sends a notification signal to a diagnostic system via the data transmission network, to signal the occurrence of the error. The notification signal may include information identifying the type of the error, occurrence time of the error, historical operation data of the stationary power equipment, etc. According to another embodiment, information needed to fix the identified error, such as technical manuals, specifications, maintenance guidance, etc., is obtained from another machine via the data transmission network coupled to the stationary power equipment. The obtained information may be used, by the stationary power equipment and/or a technician, in determining the cause of the error and/or identifying the part or parts to which the error is associated.

A diagnostic system at a remote site may couple to the intelligent stationary power equipment via a data transmission network. A request may be sent to the stationary power equipment via the data transmission network to cause the stationary power equipment to send information derived from the collected operation data via the data transmission network. The diagnostic system may determine an operation condition of the stationary power equipment based on the received information. In one embodiment, responsive to the operation condition indicating that an error has occurred, the diagnostic system may take one or more types of actions, including sending machine-executable instructions for curing the error to the stationary power equipment; collecting information related to the error, such as technical manuals, specifications, maintenance guidelines, needed parts, etc.; and/or generating work orders, parts orders and/or diagnostic reports, and so on.

Additional advantages and novel features of the present disclosure will be set forth in part in the description which follows, and in part will become apparent to those skilled in the art upon examination of the following, or may be learned by practice of the present disclosure. The embodiments shown and described provide an illustration of the best mode contemplated for carrying out the present disclosure. The disclosure is capable of modifications in various obvious respects, all without departing from the spirit and scope thereof. Accordingly, the drawings and description are to be regarded as illustrative in nature, and not as restrictive. The advantages of the present disclosure may be realized and attained by means of the instrumentalities and combinations particularly pointed out in the appended claims.

BRIEF DESCRIPTION OF THE DRAWINGS

The present disclosure is illustrated by way of example, and not by way of limitation, in the accompanying drawings, wherein elements having the same reference numeral designations represent like elements throughout.

DETAILED DESCRIPTIONS OF ILLUSTRATIVE EMBODIMENTS

In the following description, for the purposes of explanation, numerous specific details are set forth in order to provide a thorough understanding of the present disclosure. It will be apparent, however, to one skilled in the art that concepts of the disclosure may be practiced or implemented without these specific details. In other instances, well-known structures and devices are shown in block diagram form in order to avoid unnecessarily obscuring the present disclosure.

Figure 1:
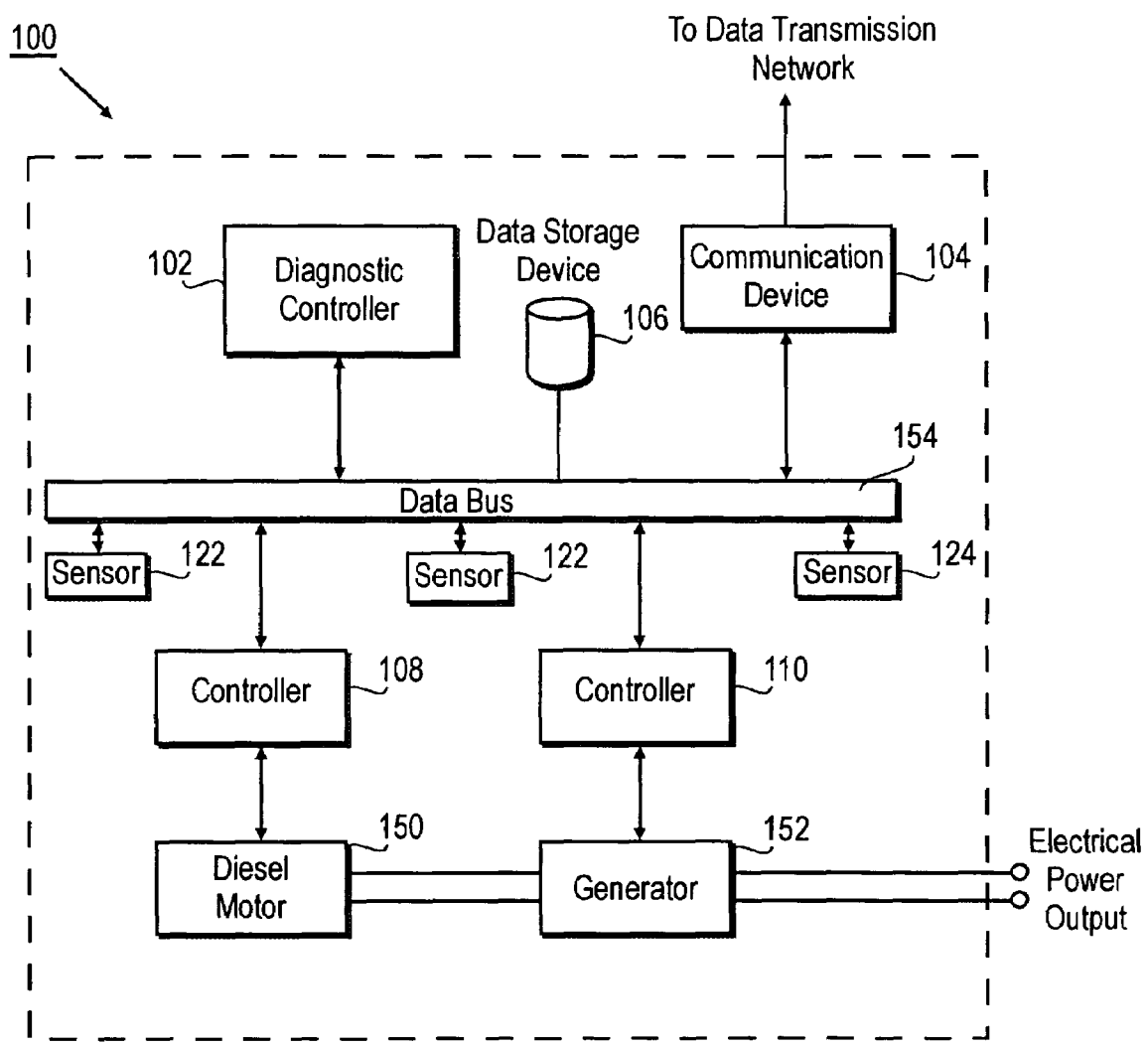
FIG. 1 is a block diagram of exemplary stationary power equipment.

FIG. 1 shows a generalized block diagram of exemplary intelligent electrical generator system 100. The intelligent electrical generator system 100 includes a diagnostic controller 102, a data storage device 106 and a communication device 104, all coupled to a data bus 154. The data storage device 106 includes at least one or a combination of dynamic storage devices, such as random access memory (RAM), and static storage devices, such as read only memory (ROM), magnetic disks, optical disks, etc., for storing information, instructions, temporary variables and/or other intermediate information during execution of instructions. The communication device 104 includes needed hardware and/or software for establishing data communications via a data transmission network in a wired or wireless manner. Examples of the data transmission network include a local area network (LAN), WiFi network, a landline or wireless telephone network, a satellite communication link, the internet, etc., or a combination thereof. In one embodiment, an exemplary intelligent electrical generator system is capable of performing wireless communications with a remote system beyond a five-mile range.

A diesel motor 150 is provided to power an electrical generator 152. A motor controller 108 and a generator controller 110 are provided to control the operations of the diesel motor 150 and the generator 152, respectively. Sensors are disposed at different locations of the system 100 to collect and updates data related to the operation of the system 100. In one embodiment, sensors 120, 122, 124, as shown in FIG. 1, are coupled to a data bus 154. If needed, sensors 120, 122, 124 are provided with sufficient intelligence to convert raw signals collected by the sensors to a format complying with a protocol used by the data bus 154. In another embodiment, sensors are couple to the data bus 154 via a controller that processes raw signals to comport to the data format used on the data bus 154. According to still other embodiment, sensors are coupled to one or more controllers directly to prove raw or processed data, without connecting to the data bus 154.

As shown in FIG. 1, the controllers 108, 110 may couple to the sensors 120, 122, 124, and/or other sub-systems that further include controllers and/or sensors. The numbers and the interconnections of the controllers and sensors are for illustration purpose only. It is understood to people skilled in the art that different numbers and arrangements of the sensors and controllers may be used to implement the concepts of this disclosure. The exact number of controllers and sensors varies depending upon the desired application and/or design preference. For instance, stationary power equipment may use a single controller in place of the diagnostic controller 102, the motor controller 108 and the generator controller 110.

The sensors 120, 122, 124 and controllers 108, 110 collectively provide various types of operation data associated with the operation of the system 100. The operation data includes raw signals, processed and/or unprocessed operation parameters, data related to an environment to which the system 100 is exposed, information related to any systems and/or devices that are coupled to the system 100, etc. Examples of data collected by the sensors 120, 122, 124 and the controllers 108, 110 include voltage, temperatures, ampere, wave phase, torque, motor rpm, pressure, switch status, resistance, impedance, signal frequency, fuel level, fuel pressure, types of communication protocols, etc. The collected operation data is stored in the data storage device 106 via the data bus 154.

In one embodiment, the diagnostic controller 102 performs an analysis on the collected operation data and determines whether an error has occurred to any of the parts or sub-systems in the system 100. In response to an error occurring in the system 100, the diagnostic controller 102 causes certain processes to be performed to avoid damages caused by the error.

Figure 2:
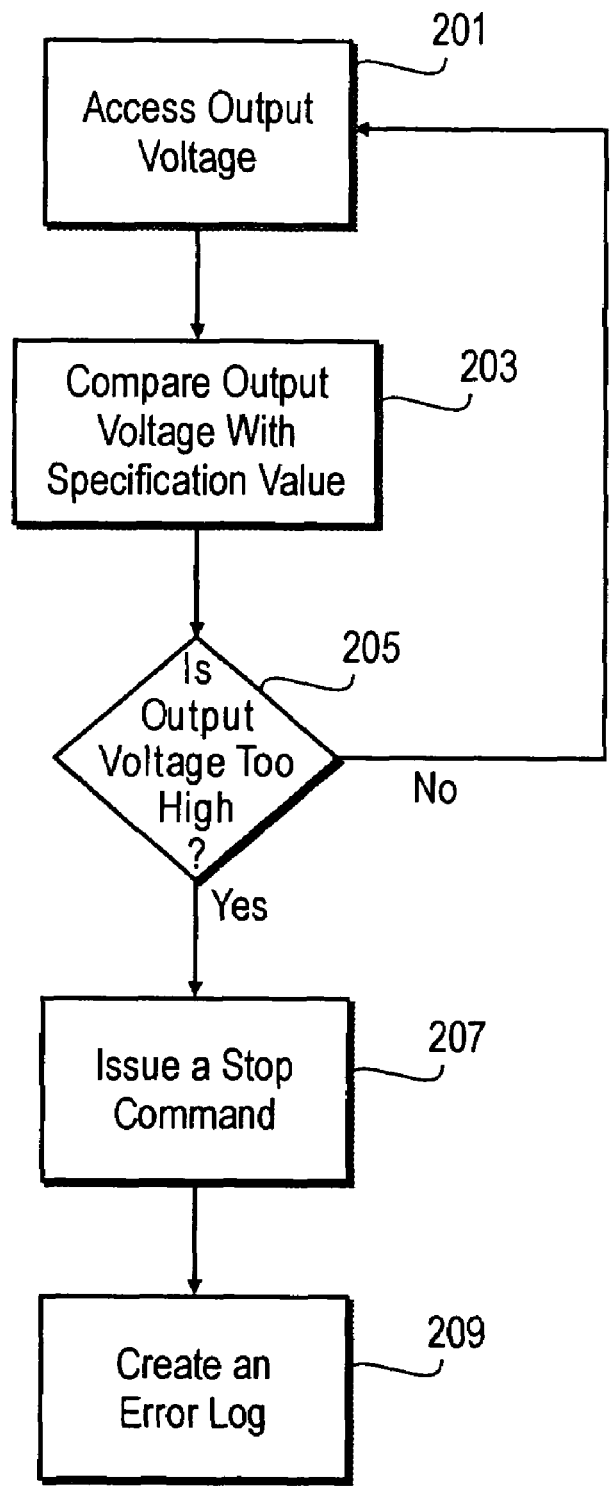
FIG. 2 is a flow chart illustrating the process for identifying the existence of a fault in a generator.

FIG. 2 shows an exemplary process performed by the system 100 for determining whether an output voltage of the generator 152 is normal. In Step 201, the diagnostic controller 102 obtains an output voltage of the generator 152. The obtained output voltage of the generator 152 is compared with a reference value, such as an acceptable voltage range (Step 203). The reference value may be presorted in the data storage device 106 or generated dynamically based on the operation of the system 100. If the diagnostic controller 102 determines that the output voltage is too high (Step 205), the diagnostic controller 102 issues a stop command to controllers 108 and 110 to shut down the diesel motor 150 and the generator 152 (Step 207). At Step 209, an error log or error record indicating a higher than normal output voltage is created and stored in the data storage device 106. The error log includes information related to types of errors, the time of errors, the parts that the errors associated to, historical operation data, steps performed by the system 100, etc. If, at Step 205, it is determined that the output voltage of the generator 152 falls in an acceptable range, a new output voltage of the generator 152 is obtained, and the evaluation process (Steps 203 and 205) is repeated.

According to another embodiment, the diagnostic controller 102 checks the health of controllers 108, 110 by polling. If any of the controllers 108, 110 is defective or is not functioning normally, the defective controller would not respond to a polling request sent by the diagnostic controller 102 in an appropriate manner. In response, an error log related to the defective controller is created and saved. According to still another embodiment, the motor controller 108 and the generator controller 110 periodically or constantly write operation data associated with the motor and the generator to a specified area in the data storage device 106. The operation data includes information and/or parameters related to the subsystem by which the controllers 108 and 110 control, such as error codes, self-diagnostic results, voltage, temperatures, ampere, wave phase, torque, motor rpm, pressure, switch status, resistance, impedance, signal frequency, fuel level, fuel pressure, etc. If any of the controllers 108 and 110 or their respective subsystems fails, the diagnostic controller 102 can access the storage area to which the failed controller writes operation data, to retrieve the operation data associated with the failed subsystem.

According to one embodiment, the diagnostic controller 102 identifies the cause of an error, and initiates a corresponding diagnostic process to cure the error or lessen the symptom. Instructions for controlling the diagnostic controller 102 to perform a diagnostic process corresponding to a specific type of error are pre-stored in the data storage device 106 and/or dynamically downloaded from a remote server or machine via the data transmission network.

Figure 3:
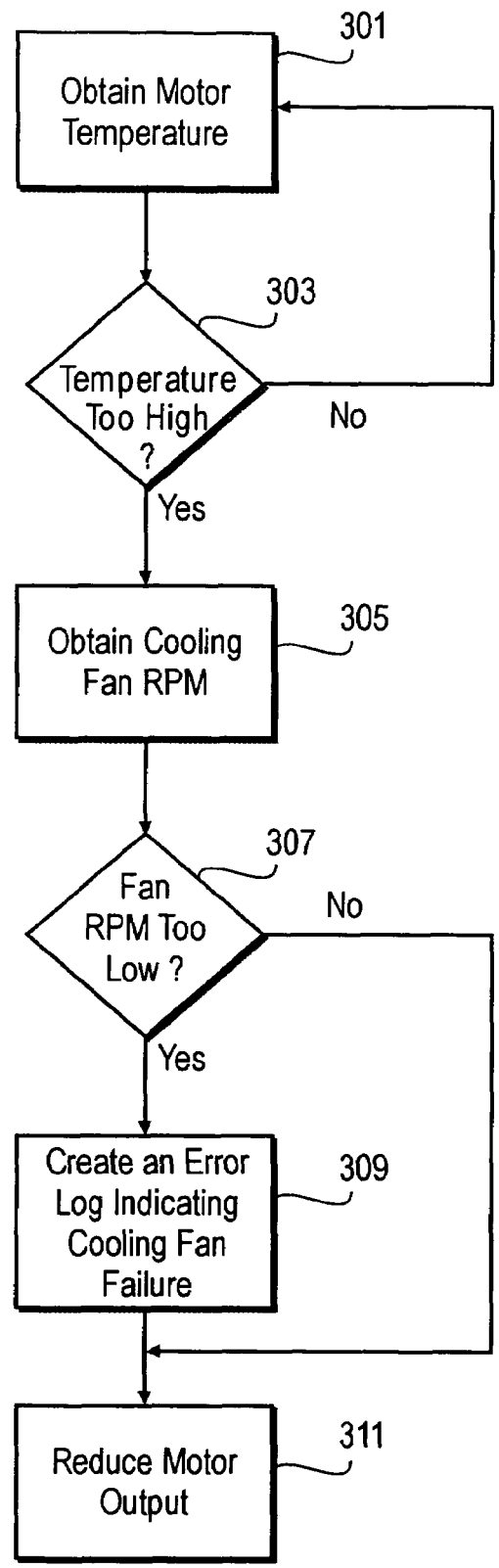
FIG. 3 is a flow chart showing an exemplary process for resolving an unusually high motor temperature.

FIG. 3 is a flow chart showing an exemplary process for resolving an unusually high temperature in the motor 150. In Step 301, data related to the motor temperature is collected by temperature sensors. In Step 303, the diagnostic controller 102 determines whether the motor temperature exceeds an acceptable threshold. If the temperature is normal, another temperature sample is obtained and Steps 301 and 303 are repeated. On the other hand, if it is determined that the motor temperature exceeds an acceptable level, the diagnostic controller 102 obtains operation data related to a cooling subsystem that is used to cool the diesel motor 150, and determines whether the cooling subsystem is working properly. For instance, in Steps 305 and 307, the diagnostic controller 102 obtains the rpm of a cooling fan used to cool the diesel motor 150, and determines if the cooling fan rpm is within a normal range. If the cooling fan rpm is too low, the diagnostic controller 102 determines that the cooling subsystem is not working properly and hence is the cause of the high motor temperature. An error log indicating an error in the cooling fan or the cooling subsystem is created and saved (Step 309). Appropriate time stamps and historical operation data may be compiled and stored in the error log. In Step 311, the diagnostic controller 102 issues a reduce output command to the motor controller 108. In response to the reduce power command, the diesel motor 150 reduces power output. Consequently, the operation temperature drops despite that the cooling subsystem is not working normally. On the other hand, if Step 307 determines that the cooling fan rpm is normal, the diagnostic controller 102 directly performs Step 311 to reduce output of the diesel motor without creating an error log associated with the cooling subsystem.

Steps 305 through 311 as shown in FIG. 3 may be implemented as a set of software instructions that is executed by the diagnostic controller 102 in response to an event of a high motor temperature. The diagnostic controller 102 obtains the instructions from the data storage device 106, or dynamically accesses the instructions from a remote server via the data transmission network. In one embodiment, the system 100 sends information related to the error log to the remote server. The remote server analyzes the error log and determines an operation status of the system 100. In response, the remote server compiles and sends data corresponding to the determined operation status. In one embodiment, the data is used by the system 100 to modify an operation of the system 100 to fix or repair a problem or error encountered by the system 100, or to provide an alternative operation scheme. For instance, the data provided by the remote system instructs the system 100 to reduce the level of voltage output when a cooling subsystem is not working properly, as described earlier.

The intelligent electrical generator system 100 generates and provides various types of diagnostic information derived from the operation data of the system 100. The diagnostic information includes at least one of the operation data, health reports, errors logs, error codes, descriptions of errors, historical operation data, communication records, actions taken by the system 100, needed actions or parts, diagnostic results, etc. According to one embodiment, the system 100 generates the diagnostic information based on the operation data and information stored in the data storage device 106 or retrieved from other systems via the data transmission network. For instance, the system 100 dynamically retrieves a diagnostic algorithm from a remote server via the data transmission network, and generates a self-diagnostic report based on the diagnostic algorithm and the operation data.

The diagnostic information is accessible from proper connector or connectors of the system 100, from a data transmission network coupled to the system 100, or from a display coupled to the system 100.

In another embodiment, in response to the occurrence of an error, the system 100 sends the information derived from the operation data to a remote diagnostic system via the data transmission network. In still another embodiment, the system 100 sends the information derived from the operation data only when a specific type of request is received from a diagnostic system via the data transmission network. In a further embodiment, the system 100 sends the information derived from the operation data to a diagnostic system via the data transmission network on a periodic basis or according to a predetermined schedule, such as every other day, twice an hour or three times a week.

Figure 4:
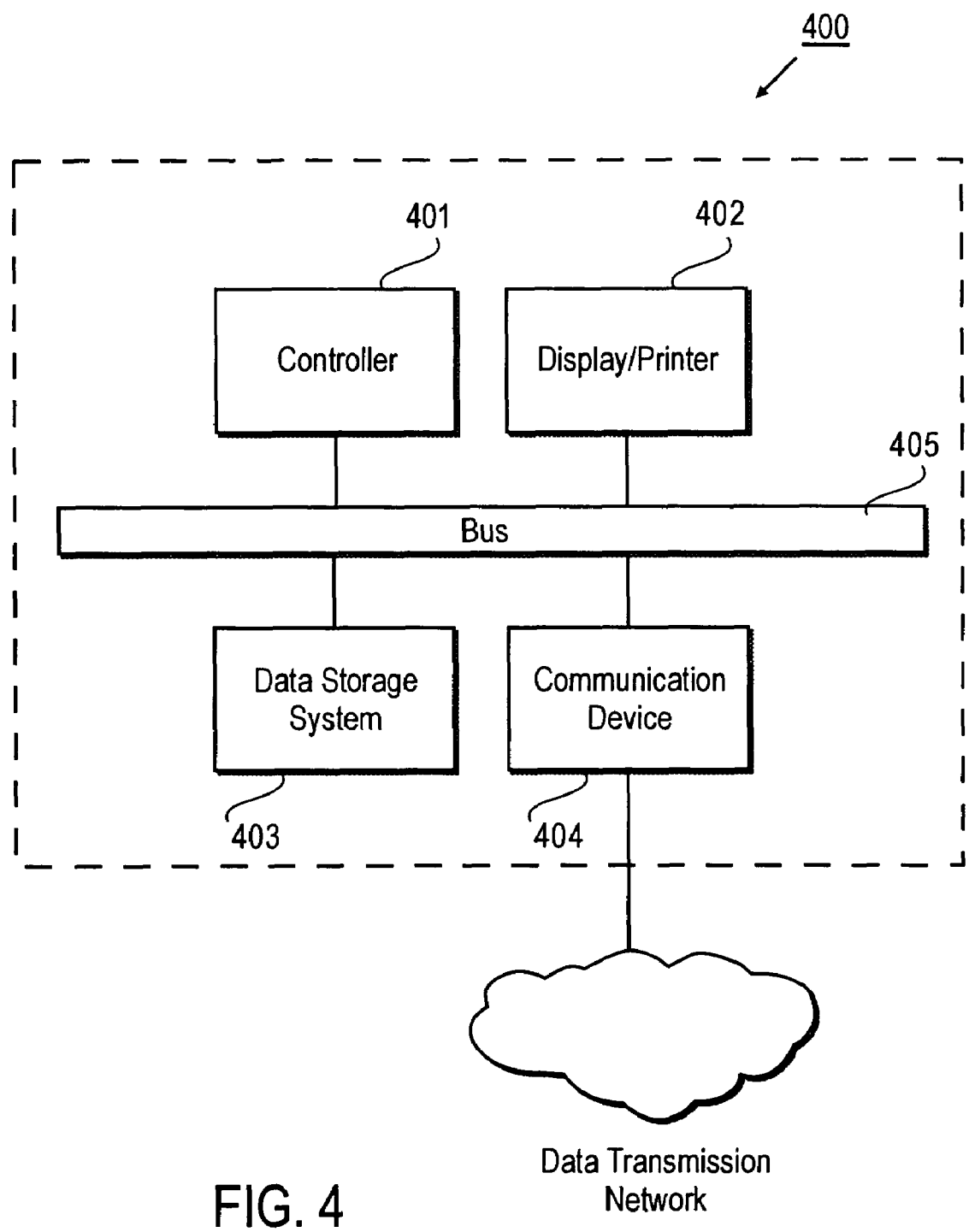
FIG. 4 depicts an exemplary diagnostic system configured to communicate with intelligent stationary power equipment.

FIG. 4 depicts an exemplary diagnostic system 400 that communicates with the intelligent electrical generator system 100 depicted in FIG. 1. The diagnostic system 400 includes a controller 401 for processing data, a data storage system 403, a display/printer 402 and a communication device 404, all of which are coupled to a bus 405. The communication device 404 enables communications between the diagnostic system 400 and the intelligent electrical generator 100 via a data transmission network, such as the internet, telephone network, local area network, etc.

In one embodiment, the information derived from the operation data of the intelligent electrical generator system 100 is sent to the diagnostic system 400, either in response to a request initiated by the controller 401 or as a result of a delivery initiated by the intelligent electrical generator system 100. The controller 401 performs an analysis on the received information. If the analysis reveals that a fault has occurred in the intelligent electrical generator system 100 and is caused by a defective part, the diagnostic system 400 automatically generates a fault report. The fault report is output to the display/printer 402, stored in the data storage system 403 and/or sent to another system coupled to the diagnostic system. In one embodiment, the diagnostic system 400 compiles and retrieves information related to the identified fault from the data storage system 403 and/or one or more databases coupled to the diagnostic system 400. The retrieved information includes at least one of descriptions of the fault, specification of the part that caused the fault, technical manuals of the intelligent power generator system 100, descriptions of needed replacement parts, and instructions to fix the fault, etc. The retrieved information is provided to a technician to assist repair of the intelligent power generator system 100. According to one embodiment, the diagnostic system 400 automatically generates a work order and/or parts order corresponding to the fault. According to another embodiment, the controller 401 retrieves a set of machine-executable instructions from the data storage system 403 and/or a database coupled to the diagnostic system 400, for curing the identified fault. Based on the control of the instructions, the diagnostic controller 102 causes the system 100 to perform appropriate steps to fix the identified fault.

According to another embodiment, the intelligent stationary power equipment of this disclosure includes an input device and a display allowing a technician to access data residing on other systems via the data transmission network. For instance, a web browser is provided for a technician to download needed technical instructions or manuals to the equipment for performing maintenance work.

According to another example, the stationary power equipment is a pumping system including four pump units powered by fossil fuel. If one or more pump units fail, an error log is created indicating the condition encountered by the pumping system. The error log is sent to a remote diagnostic center. Based on information extracted from the error log, data related to appropriate measures is collected and compiled, either manually or automatically, and is sent to the pumping system. Based on the information or instructions embedded in the data received from the remote diagnostic center, the pumping system is caused to shut down the failed pump unit or units, and increase the pumping output level of other pump units such that the same total amount of fluid is transferred by the pumping system, despite the existence of the failed pumping unit or units.

In the previous descriptions, numerous specific details are set forth, such as specific materials, structures, processes, etc., in order to provide a thorough understanding of the present disclosure. However, as one having ordinary skill in the art would recognize, the present disclosure can be practiced without resorting to the details specifically set forth. In other instances, well known processing structures have not been described in detail in order not to unnecessarily obscure the present disclosure.

Only the illustrative embodiments of the disclosure and examples of their versatility are shown and described in the present disclosure. It is to be understood that the disclosure is capable of use in various other combinations and environments and is capable of changes or modifications within the scope of the inventive concept as expressed herein.

What is claimed is:

1. Stationary power equipment comprising:
a sensing device configured to collect data associated with an operation of the stationary power equipment;
a data storage device configured to store the collected data, and to pre-store machine-readable instructions corresponding to specific operational errors;
a communication device configured to couple to a data transmission network; and
a data processing device configured to perform the steps of:
causing the communication device to transmit signals via the data transmission network in a wireless manner, wherein the transmitted signals include information derived from the collected data associated with the operation of the equipment;
receiving data sent from a remote system via the data transmission network, wherein the data is selected based on information derived from the transmitted signals; and
modifying an operation of the power equipment based on the data received from the remote system;
wherein, responsive to the information derived from the data collected by the sensing device indicating an error of the stationary power equipment, the data processing device executes the machine-readable instructions pre-stored on the data storage device for initiating a diagnostic process for performing a fix procedure to cure the error.

2. The stationary power equipment of claim 1, where the equipment is configured to generate mechanical power by using at least one of electrical energy, fuel energy, nuclear energy and mechanical power.

3. The stationary power equipment of claim 1, where the equipment is configured to generate electrical power by using at least one of fuel energy, nuclear energy and mechanical power.

4. The stationary power equipment of claim 1, wherein the information includes at least a portion of the data collected by the sensing device, or a diagnostic result generated based on the data collected by the sensing device.

5. The stationary power equipment of claim 1, wherein the sensing device dynamically updates the data associated with the operation of the stationary power equipment.

6. The stationary power equipment of claim 1, wherein the data processing device is configured to cause the communication device to transmit the signals including the information, in response to a specific type of request received from the data transmission network.

7. A diagnostic system comprising:
a communication device configured to couple to stationary power equipment via a data transmission network, wherein the stationary equipment collects data associated with an operation of the stationary power equipment; and
a data processing device configured to perform the machine-implemented steps of:
sending a request to the stationary power equipment via the data transmission network to cause the stationary power equipment to send information derived from the collected data via the data transmission network;
determining an operation condition of the stationary power equipment based on the received information; and
causing data to be sent to the power equipment via the data transmission network, wherein the data is selected based on the determined operation condition and is configured to be used by the stationary power equipment to modify an operation of the power equipment;

wherein the data processing device, responsive to the operation condition of the stationary power equipment indicating that an error has occurred, causes machine-executable instructions which are pre-stored on a data storage device, which is a local component of the stationary power equipment system, for initiating a diagnostic process for curing the error.

8. A diagnostic method embodied in stationary power equipment, comprising the machine-implemented steps of:
   collecting data associated with an operation of the stationary power equipment;
   storing the collected data associated with an operation of the stationary power equipment;
   transmitting signals including at least a portion of the collected data or information derived from the collected data associated with an operation of the equipment via a data transmission network in a wireless manner;
   receiving data sent from a remote system via the data transmission network, wherein the data is selected based on information derived from the transmitted signals; and
   modifying an operation of the power equipment based on the data received from the remote system;
   the method further comprising:
   pre-storing machine-executable instructions corresponding to specific operational errors in a local component of the stationary power equipment;
   responsive to the information indicating that an error has occurred in the stationary power equipment, accessing the pre-stored machine-executable instructions for initiating a diagnostic process for performing a fix procedure corresponding to the error; and
   executing the instructions to perform the fix procedure to cure the error.

9. The method of claim 8, where the equipment is configured to generate mechanical power by using at least one of electrical energy, fuel energy, nuclear energy and mechanical power.

10. The method of claim 8, where the equipment is configured to generate electrical power by using at least one of fuel energy, nuclear energy and mechanical power.

11. The method of claim 8, wherein the transmitting step is performed in response to a specific type of request received from the data transmission network.

12. The method of claim 8, wherein the information includes a diagnostic result generated based on the data collected by the sensing device.

13. The method of claim 8 further comprising the step of dynamically updating the data associated with the operation of the stationary power equipment.

* * * * *